(12) United States Patent
Stüempert et al.

(10) Patent No.: US 6,810,256 B2
(45) Date of Patent: Oct. 26, 2004

(54) METHOD AND SYSTEM FOR HANDLING THE TRANSCODING OF CONNECTIONS HANDED OFF BETWEEN MOBILE SWITCHING CENTERS

(75) Inventors: Martin Stüempert, Hochspeyer (DE); Phil Hodges, Armadale (AU)

(73) Assignee: Telefonaktiebolaget LM Ericsson, Stockholm (SE)

( * ) Notice: Subject to any disclaimer, the term of this patent is extended or adjusted under 35 U.S.C. 154(b) by 445 days.

(21) Appl. No.: 09/742,396

(22) Filed: Dec. 22, 2000

(65) Prior Publication Data

US 2002/0009997 A1 Jan. 24, 2002

Related U.S. Application Data

(60) Provisional application No. 60/174,165, filed on Jan. 3, 2000.

(51) Int. Cl.[7] .................................................. H04Q 7/20
(52) U.S. Cl. ........................ 455/439; 455/436; 455/438; 379/220.01
(58) Field of Search ................................ 455/436, 437, 455/438, 439, 417, 445; 379/211.01, 211.02, 221.01, 220.01

(56) References Cited

U.S. PATENT DOCUMENTS

| | | | | |
|---|---|---|---|---|
| 5,608,779 A | * | 3/1997 | Lev et al. | 455/436 |
| 6,097,951 A | * | 8/2000 | Ernam et al. | 455/433 |
| 6,108,560 A | * | 8/2000 | Navaro et al. | 455/517 |
| 6,374,112 B1 | * | 4/2002 | Widegren et al. | 370/352 |
| 6,466,556 B1 | * | 10/2002 | Boudreaux | 370/331 |
| 6,490,284 B1 | * | 12/2002 | Graf | 370/395.2 |
| 6,522,655 B1 | * | 2/2003 | Laiho | 370/410 |
| 6,567,667 B1 | * | 5/2003 | Gupta et al. | 455/445 |
| 2003/0013443 A1 | * | 1/2003 | Willars et al. | 455/432 |

* cited by examiner

Primary Examiner—William Trost
Assistant Examiner—Stephen D'Agosta

(57) ABSTRACT

A communication system supports multiple source coding and/or channel coding schemes. When a handoff is needed that transfers radiocommunication service support responsibility from a base station controlled by one MSC to a base station controlled by another MSC, signaling procedures are employed to handle the transfer as it pertains to the source coding and/or channel coding, i.e., ensuring that the new MSC links in an appropriate codec to support the handed off connection. Various techniques are described to provide such signaling, both in the direction of the new (target) MSC and in the direction of the user equipment being handed off.

19 Claims, 6 Drawing Sheets

METHOD AND SYSTEM FOR HANDLING THE TRANSCODING OF CONNECTIONS HANDED OFF BETWEEN MOBILE SWITCHING CENTERS

RELATED APPLICATION

This application is related to, and claims priority from, U.S. Provisional Patent Application Ser. No. 60/174,165, entitled "Inter-MSC Handover," filed on Jan. 3, 2000, the disclosure of which is incorporated here by reference.

BACKGROUND

The present invention generally relates to coding in the field of communication systems and, more particularly, to handling the signaling for controlling transcoding when a connection is handed off between mobile switching centers (MSCs) in radiocommunication systems.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems wherein analog modulation was used to impress data onto a carrier wave, to systems wherein digital modulation was used to impress the data on carrier waves.

In wireless digital communication systems, standardized air interfaces specify most of the system parameters, including speech coding type(s), burst format, communication protocol, etc. For example, the European Telecommunication Standard Institute (ETSI) has specified a Global System for Mobile Communications (GSM) standard that uses time division multiple access (TDMA) to communicate control, voice and data information over radio frequency (RF) physical channels or links using a Gaussian Minimum Shift Keying (GMSK) modulation scheme at a symbol rate of 271 ksps. In the U.S., the Telecommunication Industry Association (TIA) has published a number of Interim Standards, such as IS-54 and IS-136, that define various versions of digital advanced mobile phone service (D-AMPS), a TDMA system that uses a differential quadrature phase shift keying (DQPSK) modulation scheme for communicating data over RF links.

TDMA systems subdivide the available frequency into one or more RF channels. The RF channels are further divided into a number of physical channels corresponding to time slots in TDMA frames. Logical channels are formed of one or several physical channels where modulation and coding is specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. In fact, some systems now employ code division multiple access (CDMA), using a form of spread spectrum modulation wherein signals intentionally share the same time and frequency. Although digital techniques provide a greater number of useful channels from a given frequency spectrum, there still remains a need to maintain interference at acceptable levels, or more specifically to monitor and control the ratio of the carrier signal strength to interference, (i.e., carrier-to-interference (C/I) ratio).

Another factor which is increasingly important in providing various communication services is the desired/required user bit rate for data to be transmitted over a particular connection. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation, and resource allocation, e.g., for a TDMA system, this latter technique may refer to the number of assignable time slots per connection, for a CDMA system, this latter parameter may refer to the number of assignable codes per connection.

Speech coding (or more generally "source coding") techniques are used to compress the input information into a format which uses an acceptable amount of bandwidth but from which an intelligible output signal can be reproduced. Many different types of speech coding algorithms exist, e.g., residual excited linear predictive (RELP), regular-pulse excitation (RPE), etc., the details of which are not particularly relevant to this invention. More significant in this context is the fact that various speech coders have various output bit rates and that, as one would expect, speech coders having a higher output bit rate tend to provide greater consumer acceptance of their reproduced voice quality than those having a lower output bit rate. As an example, consider that more traditional, wire-based telephone systems use PCM speech coding at 64 kbps, while GSM systems employ an RPE speech coding scheme operating at 13 kbps.

In addition to speech coding, digital communication systems also employ various techniques to handle erroneously received information. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding (collectively referred to herein as "channel coding") of the data prior to modulation. Channel coding involves representing a certain number of data bits using a certain number of code bits. Thus, for example, it is common to refer to convolutional codes by their code rates, e.g., ½ and ⅓, wherein the lower code rates provide greater error protection but lower user bit rates for a given channel bit rate.

Conventionally, each of the techniques which impacted the user bit rate were fixed for any given radiocommunication system, or at least for the duration of a connection established by a radiocommunication system. That is, each system established connections that operated with one type of speech coding, one type of channel coding, one type of modulation and one resource allocation. More recently, however, dynamic adaptation of these techniques has become a popular method for optimizing system performance in the face of the numerous parameters which may vary rapidly over time, e.g., the radio propagation characteristics of radiocommunication channels, the loading of the system, the user's bit rate requirements, etc. This type of dynamic adaptation of coding techniques has been referred to in the GSM standard as adaptive multirate (AMR) communications. AMR techniques and the like are likely to be used in next generation radiocommunication systems, e.g., Universal Mobile Telecommunication Systems (UMTS).

In GSM systems, AMR techniques have been traditionally been coordinated by the base station controller (BSC). For context, consider FIG. 1, which depicts various nodes in a hybrid UMTS/GSM communication system 10. This Figure will also be referred to below in describing aspects of the present invention. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14a–14c are responsible for the routing of calls from an originator to a destination. In particular, these entities are responsible for setup, control and termination of calls. One of the MSCs 14a, known as the gateway MSC, handles communication with a Public Switched Telephone Network (PSTN) 18, or other public and private networks.

At a lower hierarchical level, each of the MSCs 14a–14c are connected to a group of BSCs 16a–b (although the BSCs are only depicted for MSC 14b to simplify the figure) using, for example, PCM (pulse code modulated) links. Under the GSM standard, the BSCs 16a–16b communicate with MSCs 14a–14c under a standard interface known as the A-interface, which is based on the Mobile Application Part (MAP) of CCITT Signaling System No. 7. Under the UMTS standard, the BSCs are referred to as radio network controllers (RNCs) and communicate with the MSCs 14a–14c over a standard interface known as the Iu interface.

At a still lower hierarchical level, each of the BSCs (RNCs) 16 controls a group of base transceiver stations (BTSS) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. As mentioned earlier, the information transmitted on these RF links may be speech coded in various ways to enhance various aspects of communication over the air interface, which coding is controlled in conventional GSM systems by the responsible BSC.

However, in next generation systems (e.g., UMTS) it has been proposed that the coding of this information be controlled by the MSC rather than the radio network controller (RNC), which is the nomenclature for the node corresponding to the BSC in third generation systems. This shifting of responsibility leads to a number of problems regarding management of coding, particularly during handoffs of connections between MSCs. For example, it will be necessary to know which MSC, i.e., the serving (anchor) MSC or the target MSC, will control the transcoder. Additionally, it will be useful to define where the radio access network protocol is terminated and the format for signaling between the MSCs involved in the handoff to control coding parameters.

Accordingly, it will be desirable to provide methods and systems for handling the transcoding of connections being handed off between MSCs which take into account these various aspects of emerging, next generation communication systems.

SUMMARY

These and other drawbacks, problems and limitations of conventional radiocommunication systems are overcome according to the present invention, wherein various signaling techniques and protocols are described for handling codec issues during inter-MSC handoff. For example, exemplary embodiments of the present invention handle codec issues associated with inter-MSC handoff by determining at least one codec that is available in a target MSC, selecting, by an anchor MSC, one of the available codecs for handling the connection, signaling the target MSC with an indication of the selected codec, and informing the user equipment of the selected codec.

Various exemplary embodiments perform these signaling steps in different ways. For example, the determination of available codecs in the target MSC may (or may not) require signaling to ascertain the target MSC's codec capabilities. If such signaling is performed, mobile application part (MAP) protocol messages may be used.

According to another aspect of the present invention, the signaling used to inform the target MSC of the selected codec may take any of a plurality of different forms. For example, the selected codec information may be forwarded to the target MSC as a MAP message which is independent of another message wherein the radio access bearer (RAB) assignment is forwarded. Alternatively, the selected codec information can be passed to the target MSC using the same message by which the RAB is assigned. Different protocols, e.g., radio access network application protocol (RANAP) or base station system management application part (BSSMAP) can be used to as the signaling protocol for these messages.

Likewise, signals informing the user's equipment of the selected codec can be provided in different forms. For example, a call control message can be sent to the user's equipment identifying the selected codec so that it is prepared to properly process messages for transmission and reception after the inter-MSC handoff. Alternatively, an RANAP message identifying the RAB can also be used to convey selected codec information to the user equipment.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

Figure 1:
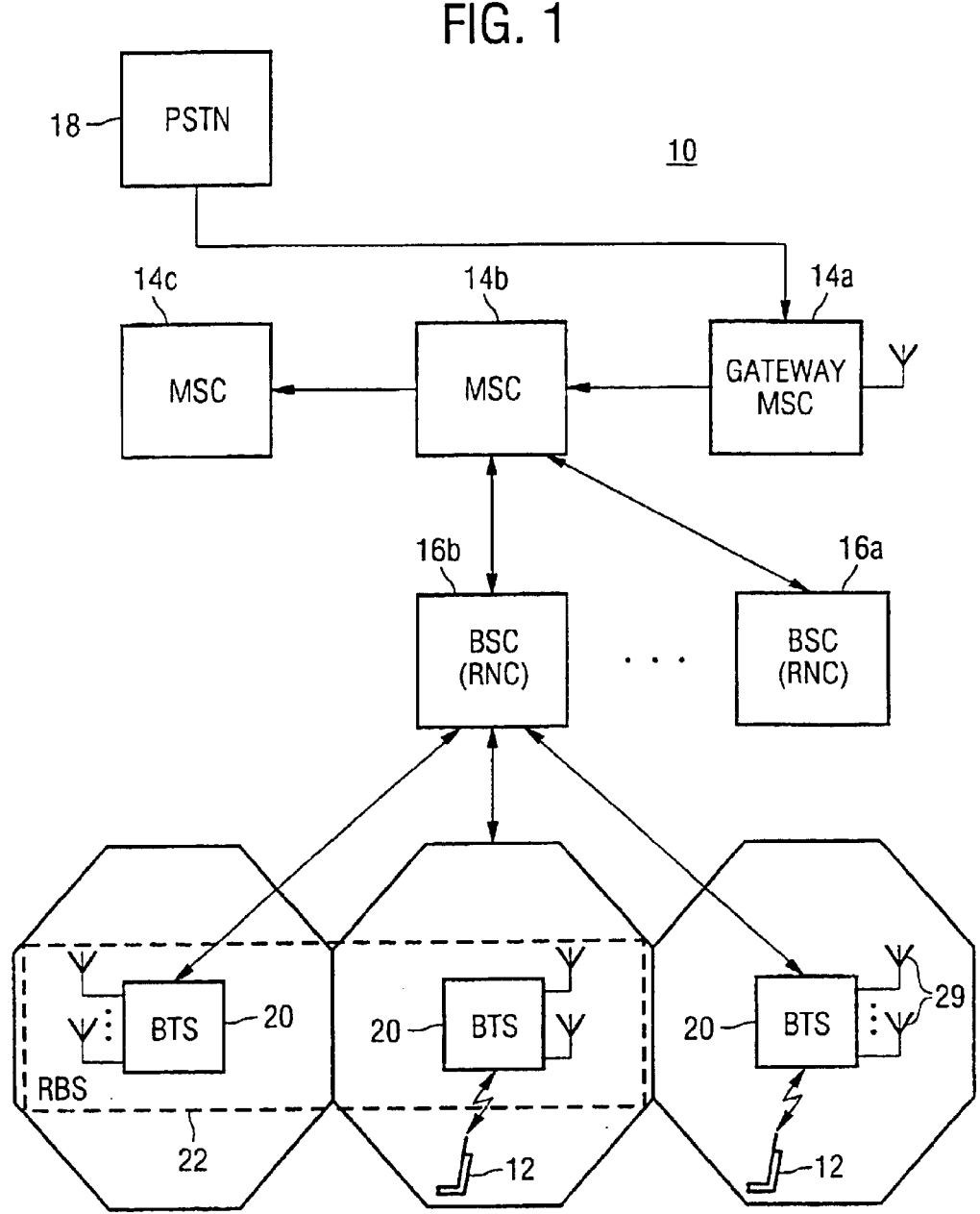
FIG. 1 is a block diagram of an exemplary GSM communication system which advantageously uses the present invention.

The various features of the invention will now be described with reference to the figures, in which like parts are identified with the same reference characters. In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof.

Moreover, operation in accordance with GSM communication systems is described in, for example, European Telecommunication Standard Institute (ETSI) documents ETS 300 573, ETS 300 574 and ETS 300 578, which are hereby incorporated by reference. Therefore, the operation of the GSM system is only described herein to the extent necessary for understanding the present invention. Similar standards related documents are also available for UMTS. Although, the present invention is described in terms of exemplary embodiments in a UMTS/GSM system, those skilled in the art will appreciate that the present invention may be applicable to digital communication systems.

When user equipment (UE), e.g., a mobile phone or personal digital assistant, moves to a location wherein its wireless connection with a fixed network has deteriorated to a point where a new connection is desirable, a handoff procedure is initiated to provide the UF with continued service via a different portion of the fixed network. In some cases, the best candidate base station for providing this continued service is controlled by a different (target) MSC than that which is currently controlling the UE's service, i.e., the anchor MSC, in which case the handoff can be referred to as an "inter-MSC" handoff. Various control signaling is performed in order to accomplish inter-MS C handoffs.

Figure 2:
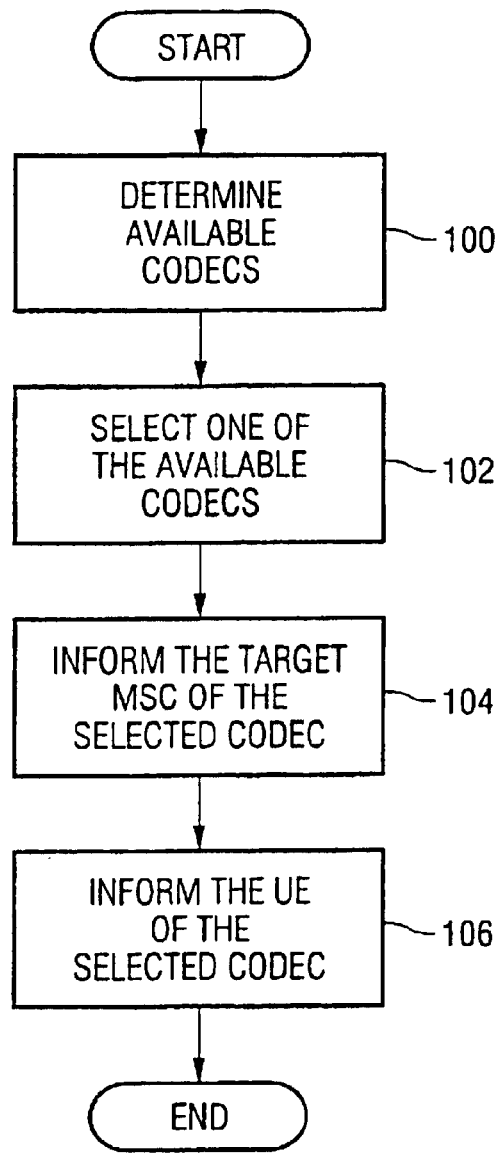
FIG. 2 is a flow chart depicting a general set of steps for handling inter-MSC handoff according to exemplary embodiments of the present invention.

In general, the handling of codec control during inter-MSC handoff according to the present invention follows a number of steps as illustrated in FIG. 2. Therein, at step 100, the codecs available in the target MSC are determined. Those skilled in the art will appreciate that not all MSCs will contain the same type and number of codecs and, therefore, it is useful to determine the target MSCs codec capabilities before making a codec selection. This determination may be rather straightforward if the codecs supported by the target MSC are administered by the anchor MSC. Alternatively, a message can be transmitted from the anchor MSC to the target MSC to request a supported codec list therefrom. These messages may be formatted as, for example, MAP messages since MAP messages will terminate in the target MSC.

In any event, once the anchor MSC has determined the codecs available in the target MSC, a codec selection is made to determine which codec in the target MSC shall be linked in to handle the connection once it has been handed off (step 102). This selection can be based on a comparison between the codec list associated with the target MSC and the codecs supported by the UL, the latter of which can be identified to the anchor MSC during call set-up. For example, the call setup message (or call confirmation message) transmitted from the UE to the anchor MSC may include a GSM codec list and a UMTS codec list. Separate lists may be provided for each system in order to ensure unique codec identification, e.g., since AMR for GSM and AMR for UMTS may differ in rate adaptation and discontinuous transmission (DTX) modes. Additionally, the UE may transmit a separate intersystem code handoff list which may include preferences for the codec selected during inter-MSC handoff described below. If the target MSC and the UE support more than one of the same codecs, then a selection from among the common codecs can be made based on preferences, e.g., either network preferences, UE preferences or some combination thereof. The particular mechanism by which a particular codec is selected for handling the connection after the handoff is beyond the scope of this discussion.

After a codec is selected for use in the target MSC, the target MSC needs to be informed of that selection in step 104 so that it can link in the selected codec to handle the connection once it is handed off. Likewise, at step 106, the UE needs to be informed of the codec selection so that it can employ the appropriate codec post-handoff. Those skilled in the art will appreciate that steps 104 and 106 can be performed in any temporal order including simultaneously.

Those skilled in the art will also appreciate that steps 100–106 illustrated in FIG. 2 can be implemented in many different ways depending, for example, upon network topologies and which systems, e.g., GSM and/or UMTS, are involved in the inter-MSC handoff process. Several examples will now be provided to illustrate these variations.

Figure 3:
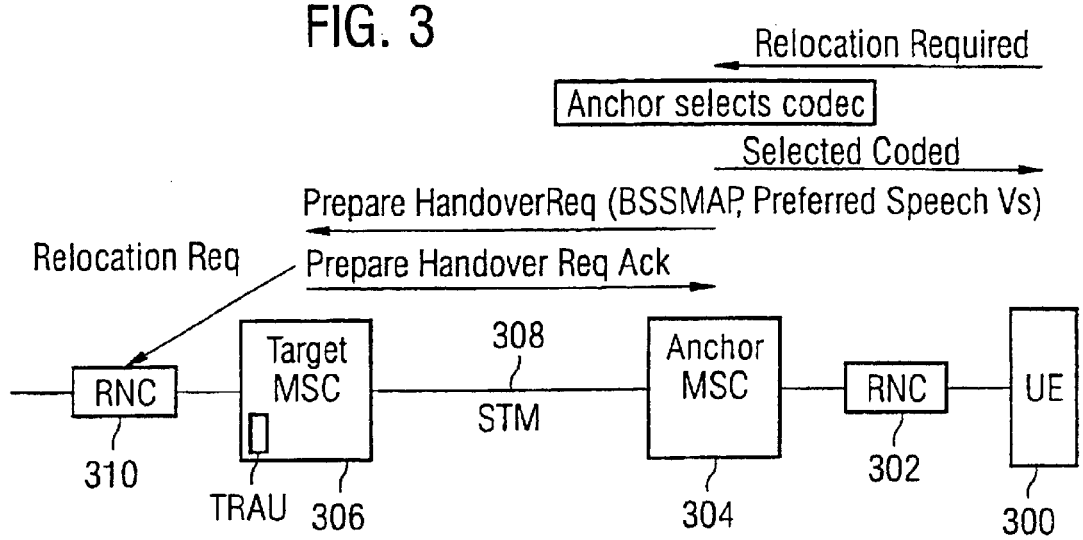
FIG. 3 is a signaling/block diagram which depicts inter-MSC handoff signaling according to an exemplary embodiment of the present invention.

Consider the example of FIG. 3 for a handoff between two MSCs which operate in accordance with the UMTS standard. Therein, a UE 300 needs a handoff (relocation required by RNC) due to, for example, a change in position relative to a serving RNC 302 or base station (not shown) associated therewith. A relocation request is communicated through to the anchor MSC 304 which then begins, among other tasks, to coordinate the codec transition to the new (target) MSC 306. In this particular example, the anchor MSC 304 administers the codecs in the target MSC 306, such that no signaling needs to be performed between the two MSCs to establish the codec capability of the target MSC 306 prior to a selection being made. The anchor MSC 304 can, therefore, make its codec selection based upon its a priori knowledge of the codecs available in the target MSC 306, UE 300 and preferences.

Once a codec selection is made, the anchor MSC 304 informs the target MSC 306 and UE 300 of the selection using different mechanisms. According to this exemplary embodiment, the anchor MSC 304 sends a BSSMAP Prepare HandoverRequest Message which includes, as a parameter, the preferred speech version over a synchronous transfer mode (STM) link 308. The preferred speech version indicates which type of codec is to be seized by the target MSC 306 for this handoff. Those skilled in the art will recognize that BSSMAP is the acronym for Base Station System Management Application Part which identifies a protocol which is used over the A-interface. Those interested readers desiring more information regarding BSSMAP protocols are directed to the published standard GSM 08.08: "Digital cellular telecommunications system (Phase 2+); Mobile Switching Centre—Base Station System (MSC-BSS) interface Layer 3 specification," the disclosure of which is incorporated here by reference, for more information. The BSSMAP message may also inform the target MSC 306 which radio access bearer (RAB) is requested for the new connection. The target MSC 306, in turn, provides the relevant RNC 310 with a Relocation Request over the Iu interface to alert it to its responsibilities for the handoff of UE 300 thereto. The target MSC 306 also acknowledges the PrepareHandover Request message to the anchor MSC 304. In the UE direction, the anchor MS 304 sends a call control (CC) message informing the UE 300 of the selected codec.

Figure 4:
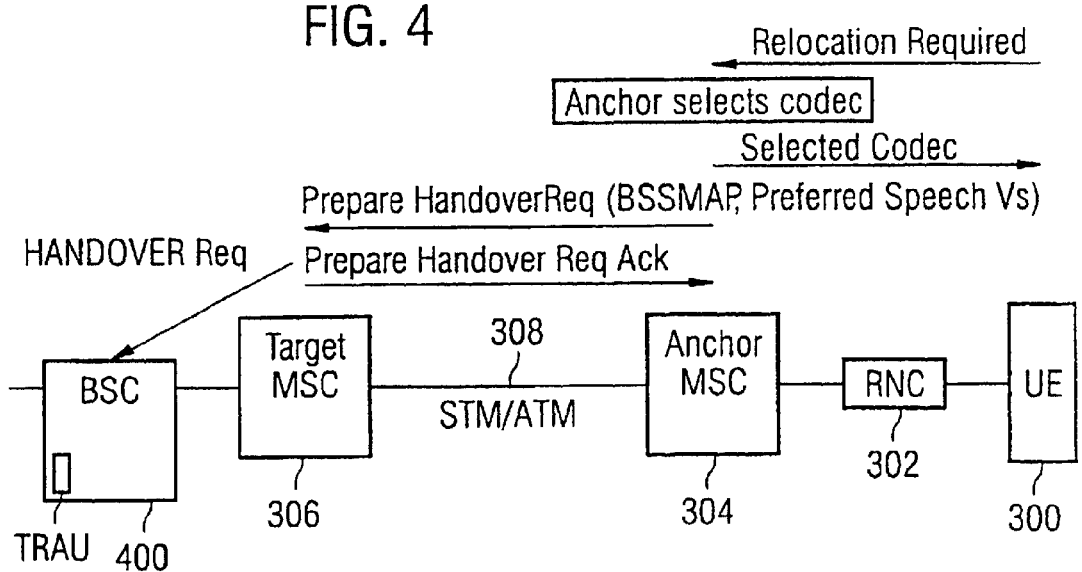
FIG. 4 is a signaling/block diagram which depicts inter-MSC handoff signaling according to another exemplary embodiment of the present invention.

According to another embodiment of the present invention illustrated in FIG. 4, the inter-MSC handoff occurs from a UMTS network to a GSM network. Therein, similar reference numerals are used to refer to similar functional units as set forth above with respect to FIG. 3. Moreover, to avoid redundancy, those similarities between the two embodiments are not repeated here and reference is made to the foregoing for the description of similar signaling. Unlike the embodiment of FIG. 3, however, the target MSC 306 coordinates with a target BSC 400 which contains the transcoder unit (TRAU) to be used to support the UE 300 after the handoff. Thus, in this embodiment, the selected codec information is passed from the target MSC 306 to the BSC 400 over the A-interface via a Handover Request message. Also note that the link 308 between the (GSM) target MSC 306 and the (UMTS) anchor MSC 304 can either be an STM link or an asynchronous transfer mode (ATM) link.

Figure 5:
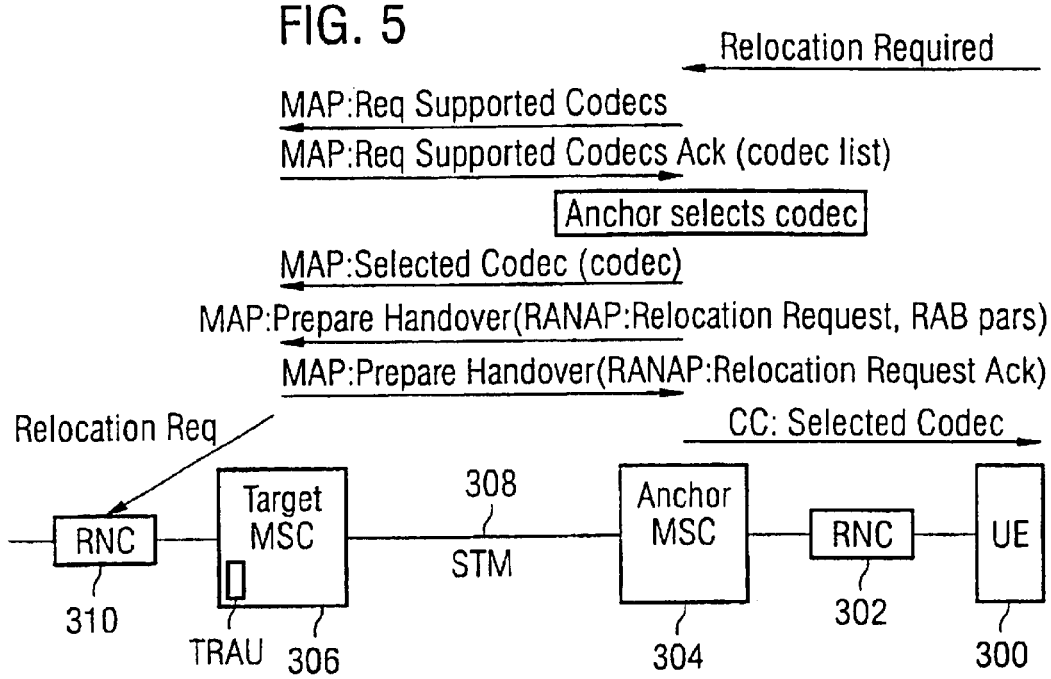
FIG. 5 is a signaling/block diagram which depicts inter-MSC handoff signaling according to yet another exemplary embodiment of the present invention.

Another variation of a UMTS MSC to UMTS MSC handoff is depicted in the exemplary embodiment of FIG. 5. Again, similar reference numerals are used to refer to similar functional units as set forth above with respect to FIG. 3 and differences are discussed with respect thereto. Therein, the anchor MSC 304 is not responsible for administering the codecs supported by the target MSC 306. Accordingly, step 100 of FIG. 2 is performed by sending a MAP message requesting that the supported codecs be identified over the STM link 308 and receiving a MAP response indicating those supported codecs so that the anchor MSC 304 can then select a codec, e.g., by comparison to a list supplied by UE 300 and preferences, for the handoff.

Once a codec is selected, the anchor MSC 304 sends a MAP message indicating the selected codec to the target MSC 306. Unlike the embodiment of FIG. 3, the signaling associated with the selected codec in this embodiment is separate from the signaling relocation request signaling, which permits the relocation request signaling to be codec independent. This, in turn, provides for a clear separation of functionality as MAP signalling is used in both GSM and UMTS systems and terminates in the target MSC. Additionally, the embodiment of FIG. 5 employs the RANAP protocol for transmitting the relocation request message, as opposed to the BSSMAP protocol employed in the exemplary embodiment of FIG. 3. Those skilled in the art will recognize that RANAP is the acronym for Radio Access Network Application Protocol which identifies the protocol defined for use over the Iu interface between UMTS MSCs and RNCs to maintain links there between. For more information regarding RANAP signaling in general, the interested reader is directed to the published standard 3 GPP 25.413: "Iu interface RANAP signaling," the disclosure of which is incorporated here by reference.

Figure 6A:
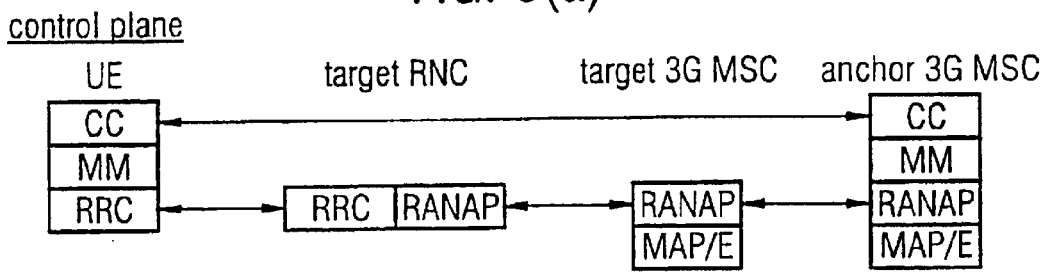
FIGS. 6(a) and 6(b) depict protocol stacks for the control plane and user plane, respectively, for the exemplary embodiments of FIG. 5.
Figure 6B:
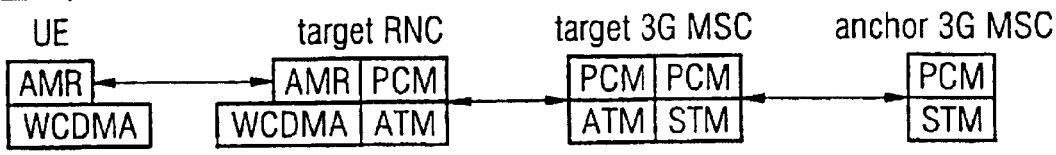

The embodiments of FIGS. 3–5 are depicted using signaling diagrams and functional block units. However, as will be appreciated by those skilled in the art, the choice of signaling protocols used to perform codec handling during inter-MSC handoff according to the present invention can also be described using protocol stacks. The resulting protocol stacks after handoff from the anchor MSC 304 to the target MSC 306 (with an STM link there between) are illustrated in FIGS. 6(*a*) and 6(*b*) for the control plane and user plane, respectively. A non-access stratum (NAS) container can be used to covey the chosen codec information from the MSC to the UE.

Figure 7:
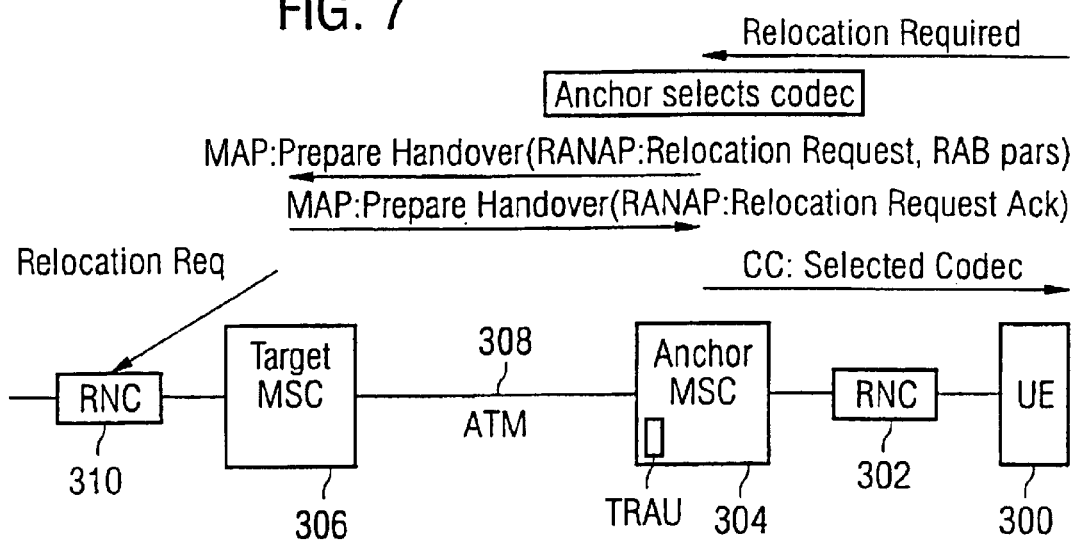
FIG. 7 is a signaling/block diagram which depicts inter-MSC handoff signaling according to still another exemplary embodiment of the present invention.
Figure 8A:
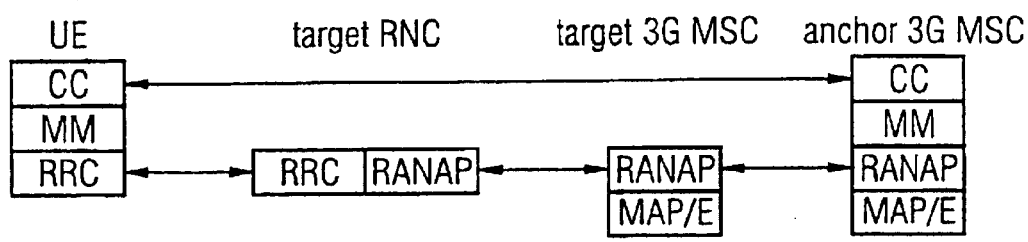
FIGS. 8(a) and 8(b) depict protocol stacks for the control plane and user plane, respectively, for the exemplary embodiment of FIG. 7.
Figure 8B:
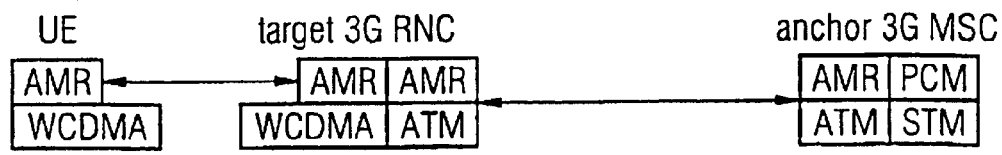

If ATM links are used between the MSCs involved in the handoff, then ATM need not be terminated in the target MSC 306 and compressed speech, for example, can be passed transparently through the target MSC 306 to the anchor MSC 304. This means, in turn, that transcoding need not necessarily be performed in the target MSC 306 and, instead, can be performed in the anchor MSC 304. One exemplary embodiment which illustrates an inter-MSC handoff using an ATM link is provided as FIG. 7. Therein, it will be noted that the signaling used to perform the inter-MSC handoff is similar as that described above and illustrated in FIG. 5, with the exception that there is no need to inform the target MSC 306 of the selected codec, since the same codec in the anchor MSC 304 is used both pre- and post-handoff. Thus, from the protocol stack perspective (see FIGS. 8(*a*) and 8(*b*)), the target MSC 306 is transparent on the user plane and is used only for performing RANAP control signaling. Those skilled in the art will appreciate that although the embodiment of FIGS. 7, 8(*a*) and 8(*b*) provides certain advantages, e.g., compressed speech through to anchor MSC and continued use of the same codec after handoff, that the techniques described above with respect to FIGS. 3–5 can also be used in circumstances where ATM links exist between the relevant MSCs.

Figure 9:
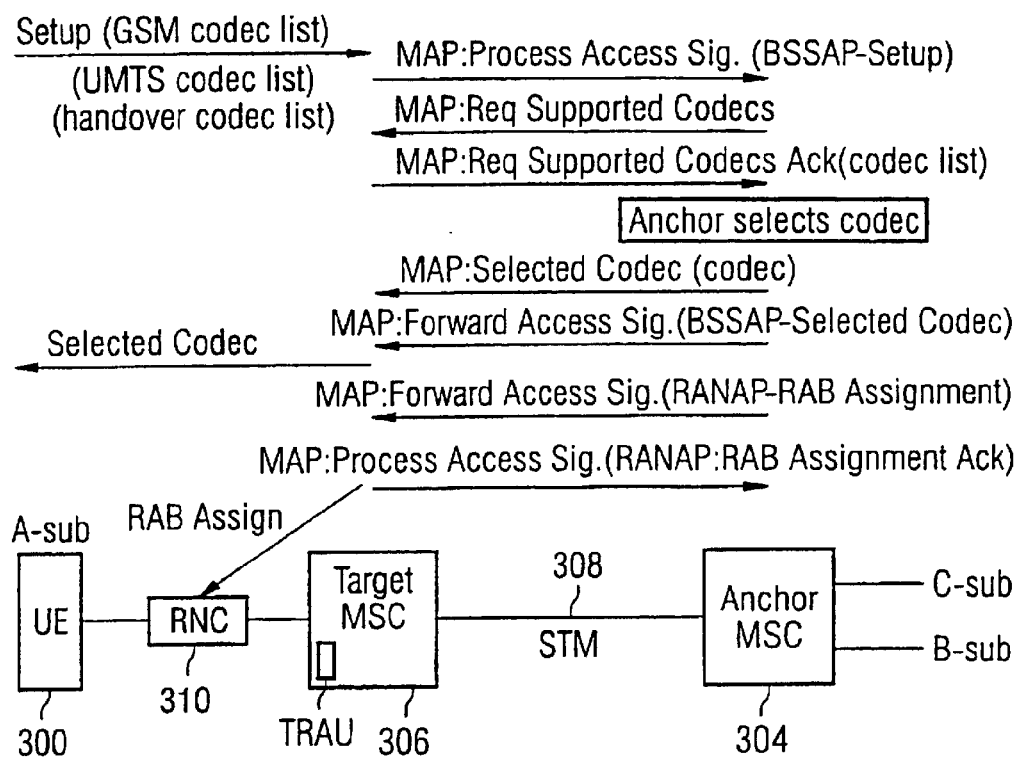
FIG. 9 is a signaling/block diagram which depicts inter-MSC handoff signaling according to still another exemplary embodiment of the present invention.

FIG. 9 depicts yet another example of signaling between various units associated with inter-MSC handoff according to the present invention. Therein, the UE 300's codec lists are forwarded to the system during call setup. The target MSC is interrogated via MAP signaling for its list of supported/available codecs, after which the anchor selects a codec for the handoff. The UE and the target MSC are informed of the selection via various MAP and/or RANAP signaling as shown.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. A method for providing radiocommunications with a user equipment within a mobile communications network, comprising the steps of:
   determining to handover a connection associated with said user equipment from an anchor mobile switching center (MSC) to a target MSC;
   determining at least one codec that is available in said target MSC by said anchor MSC;
   receiving, at said anchor MSC from said user equipment, an indication of at least one codec supported by said user equipment wherein separate lists of available codecs are received from said user equipment for different types of accesses;
   selecting, by said anchor MSC, one of said at least one available codecs for handling said connection;
   signaling said target MSC with an indication of said selected one of said at least one available codecs; and
   informing said user equipment of said selected one of said at least one available codecs by said anchor MSC.

2. The method of claim 1, wherein said step of determining further comprises the step of:

signaling said target MSC to request identification of said at least one available codec.

3. The method of claim 2, wherein said step of determining further comprises the steps at sending a mobile application part (MAP) protocol message requesting said identification of said at least one available codec; and receiving a MAP protocol message with said identification of said at least one available codec.

4. The method of claim 1, further comprising the step of:

administering a list of available codecs for said target MSC in said anchor MSC.

5. The method of claim 1, wherein said indication is transmitted as part of a call setup message.

6. The method of claim 1, wherein said indication is transmitted as part of a call confirmation message.

7. The method of claim 1, wherein said step of selecting further comprises the steps of:

comparing said at least one available codec associated with said target MSC to said indication of said at least one codec in said list received from said user equipment for a corresponding target radio access; and selecting said one of said at least one available codecs based on said comparing step.

8. The method of claim 1, wherein said step of informing said user equipment further comprises the step of:

transmitting a control channel message to said user equipment including an indication of said selected one of said at least one available codecs.

9. The method of claim 1, wherein an asynchronous transfer mode (ATM) link is used to convey signals between said target MSC and said anchor MSC, said method further comprising the step of:

continuing to use a codec in said anchor MSC to handle said connection after handoff to said target MSC.

10. A method for providing radiocommunications with a user equipment within a mobile communications network, comprising the steps of:

determining to handover a connection associated with said user equipment from an anchor mobile switching center (MSC) to a target MSC;

determining at least one codec that is available in said target MSC by said anchor MSC;

receiving, at said anchor MSC from said user equipment, an indication of at least one codec supported by said user equipment;

comparing said at least one codec associated with said target MSC to said indication of said at least one codec supported by said user equipment;

selecting, by said anchor MSC, one of said at least one available codecs for handling said connection;

signaling said target MSC with an indication of said selected one of said at least one available codecs; and informing said user equipment of said selected one of said at least one available codecs by said anchor MSC.

11. A method for providing radiocommunications with a user equipment within a mobile communications network, comprising the steps of:

determining to handover a connection associated with said user equipment from an anchor mobile switching center (MSC) to a target MSC;

determining at least one codec that is available in said target MSC by said anchor MSC;

selecting, by said anchor MSC, one of said at least one available codecs for handling said connection;

transmitting a mobile application part (MAP) message which includes said indication of said selected one of said at least one available codec to said target MSC from said anchor MSC wherein said step of transmitting further comprises the step of transmitting, as a message which is independent of said MAP message, a radio access bearer (RAB) assignment message from said anchor MSC to said target MSC; and informing said user equipment of said selected one of said at least one available codecs by said anchor MSC.

12. A method for providing radiocommunications with a user equipment within a mobile communications network, comprising the steps of:

determining to handover a connection associated with said user equipment from an anchor mobile switching center (MSC) to a target MSC;

determining at least one codec that is available in said target MSC by said anchor MSC;

selecting, said anchor MSC, one of said at least one available codecs for handling said connection;

transmitting a mobile application part (MAP) message which includes said indication of said selected one of said at least one available codec to said target MSC from said anchor MSC wherein said step of transmitting further comprises transmitting a radio access network application protocol (RANAP) message which includes said indication of said selected one of said at least one available codec to said target MSC from said anchor MSC; and informing said user equipment of said selected one of said at least one available codecs by said anchor MSC.

13. The method of claim 12, further comprising the step of:

terminating said RANAP message in said anchor MSC and forwarding said indication to said user equipment as part of setup message.

14. A method for providing radiocommunications with a user equipment within a mobile communications network, comprising the steps of:

determining to handover a connection associated with said user equipment from an anchor mobile switching center (MSC) to a target MSC;

determining at least one codec that is available in said target MSC by said anchor MSC;

selecting, by said anchor MSC, one of said at least one available codecs for handling said connection;

transmitting a mobile application part (MAP) message which includes said indication of said selected one of said at least one available codec to said target MSC from said anchor MSC wherein said step of transmitting further comprises transmitting a base station system management application part (BSSMAP) message which includes said indication of said selected one of said at feast one available codec to said target MSC from said anchor MSC; and informing said user equipment of said selected one of said at least one available codecs by said anchor MSC.

15. A method for providing radiocommunications with a user equipment within mobile communications network, comprising the steps of:

determining to handover a connection associated with said user equipment from an anchor mobile switching center (MSC) to a target MSC;

determining at least one codec that is available in said target MSC by said anchor MSC;

selecting, by said anchor MSC, one of said at least one available codecs for handling said connection;

signaling said target MSC with an indication of said selected one of said at least one available codecs; and informing said user equipment of said selected one of said at least one available codecs by said anchor MSC by forwarding an indication of said selected one of said at least one available codecs to said user equipment as part of a radio access network application protocol (RANAP) message which includes a radio access bearer (RAB) assignment.

16. A method for providing radiocommunications with a user equipment within a mobile communications network, comprising the steps of:

determining to handover a connection associated with said user equipment from an anchor mobile switching center (MSC) to a target MSC;

determining at least one codec that is available in said target MSC by said anchor MSC;

selecting, by said anchor MSC, one of said at least one available codecs for handling said connection;

transmitting a mobile application part (MAP) message which includes said indication of said selected one of said at least one available codec to said target MSC from said anchor MSC: and informing said user equipment of said selected one of said at least one available codecs by said anchor MSC by transmitting a control channel message to said user equipment including an indication of said selected one of said at least one available codecs.

17. A method for handing off a connection within a mobile communications network, comprising the steps of:

determining to handover a call connection associated with said user equipment from an anchor mobile switching center (MSC) to a target MSC;

signalling codec information, associated with handing off said connection, between said anchor MSC and said target MSC using a protocol stack which includes radio access network application protocol (RANAP) and mobile application part (MAP) protocol wherein an asynchronous transfer mode (ATM) link is used to signal control information between said target MSC and said anchor MSC;

signalling said codec information between said target MSC and a target radio network controller (RNC) using said RANAP protocol;

terminating said RANAP protocol in said target RNC;

conveying said codec information to said user equipment as part of a radio bearer setup message; and continuing to use a codec in said anchor MSC to handle said connection with said user equipment after handoff to said target MSC.

18. The method of claim 17 wherein a non-access stratum (NAS) container delivers said codec information from said target MSC to said user equipment via said RANAP protocol and said radio bearer setup message.

19. The method of claim 17 wherein a link between said target MSC and said anchor MSC Is an STM link.

* * * * *

UNITED STATES PATENT AND TRADEMARK OFFICE
CERTIFICATE OF CORRECTION

PATENT NO. : 6,810,256 B2 Page 1 of 1
APPLICATION NO. : 09/742396
DATED : October 26, 2004
INVENTOR(S) : Stüempert et al.

It is certified that error appears in the above-identified patent and that said Letters Patent is hereby corrected as shown below:

In Column 1, Line 37, delete "ksps" and insert -- kbps --, therefor.

In Column 3, Line 27, delete "(BTSS)" and insert -- (BTSs) --, therefor.

In Column 5, Line 37, delete "UF" and insert -- UE --, therefor.

In Column 5, Line 66, delete "UL" and insert -- UE --, therefor.

In Column 9, Line 4, in Claim 3, delete "at" and insert -- of: --, therefor.

In Column 10, Line 19, in Claim 12, after "selecting," insert -- by --.

In Column 10, Line 56, in Claim 14, delete "feast" and insert -- least --, therefor.

Signed and Sealed this

Ninth Day of September, 2008

JON W. DUDAS
*Director of the United States Patent and Trademark Office*